US011669082B2

(12) United States Patent
Wu et al.

(10) Patent No.: US 11,669,082 B2
(45) Date of Patent: Jun. 6, 2023

(54) ONLINE FAULT LOCALIZATION IN INDUSTRIAL PROCESSES WITHOUT UTILIZING A DYNAMIC SYSTEM MODEL

(71) Applicant: Siemens Aktiengesellschaft, Munich (DE)

(72) Inventors: Xiaofan Wu, North Brunswick, NJ (US); Ulrich Münz, Princeton, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 161 days.

(21) Appl. No.: 17/051,379

(22) PCT Filed: May 14, 2019

(86) PCT No.: PCT/US2019/032125
§ 371 (c)(1),
(2) Date: Oct. 28, 2020

(87) PCT Pub. No.: WO2019/222152
PCT Pub. Date: Nov. 21, 2019

(65) Prior Publication Data
US 2021/0232132 A1 Jul. 29, 2021

Related U.S. Application Data

(60) Provisional application No. 62/673,467, filed on May 18, 2018.

(51) Int. Cl.
*G05B 23/02* (2006.01)
(52) U.S. Cl.
CPC ..... *G05B 23/0254* (2013.01); *G05B 23/0218* (2013.01); *G05B 23/0245* (2013.01)

(58) Field of Classification Search
CPC ............ G05B 23/0245; G05B 23/0254; G05B 23/0248
See application file for complete search history.

(56) References Cited

U.S. PATENT DOCUMENTS 5,887,041 A * 3/1999 Zachar .................. G21C 17/00
376/245
6,208,953 B1 * 3/2001 Milek ...................... G07C 3/00
703/2

(Continued)

OTHER PUBLICATIONS

Derek Rowell, "Analysis and Design of Feedback Control Systems State-Space Representation of LTI Systems," Oct. 2002, downloaded from http://web.mit.edU/2.14/www/Handouts/StateSpace.pdf, downloaded on Jun. 1, 2022 (Year: 2002).*

(Continued)

*Primary Examiner* — Eman A Alkafawi
*Assistant Examiner* — Denise R Karavias

(57) ABSTRACT

A method and system for localizing faults in an industrial process is proposed. The industrial process includes a plurality of components. The method includes receiving structural plant data from an industrial plant. A structured model of the process is generated from the structural plant data. Sensor data measuring characteristics of the plurality of components is also received. Parameters of the structured model are identified from the received sensor data and stored. Faults are detected during operation of the industrial plant utilizing the identified parameters and detecting changes in the parameters by comparing current parameters to stored parameters. The fault information is then displayed via a display to an operator.

14 Claims, 4 Drawing Sheets

(56) References Cited

U.S. PATENT DOCUMENTS

| | | | |
|---|---|---|---|
| 2006/0025961 A1 | 2/2006 | Appel et al. | |
| 2009/0037772 A1* | 2/2009 | Wegerich | G06N 5/025 714/E11.002 |
| 2010/0222899 A1* | 9/2010 | Blevins | G05B 19/0426 703/2 |
| 2011/0276160 A1* | 11/2011 | Kelly | G06Q 10/067 700/103 |
| 2014/0046881 A1* | 2/2014 | Losl | G06N 20/00 706/14 |
| 2015/0095003 A1* | 4/2015 | Horowitz | G05B 23/0254 703/6 |
| 2018/0031587 A1* | 2/2018 | Bierweiler | G01N 35/00693 |
| 2018/0369869 A1* | 12/2018 | Filmer | C22B 11/00 |
| 2019/0086902 A1* | 3/2019 | Ganachari | H04L 43/0811 |

OTHER PUBLICATIONS

Wangyun Won et al., "Delta-Operator-based adaptive model predictive control and online optimization of a natural gas liquefaction process," 2017, ScienceDirect, Chemical Engineering Science, downloaded from https://www.sciencedirect.com/science/article/pii/S0009250916307308, downloaded on Jun. 1, 2022 (Year: 2017).*

Shane Kling, Is it Dumb to Have Smart P&IDs?, AECCafe, Sep. 9, 2017, downloaded from https://www10.aeccafe.com/blogs/complianceparadigms/2017/09/09/is-it-dumb-to-have-smart-pids/ on Oct. 27, 2022 (Year: 2017).*

Won Wangyun et al: "Delta-operator-based adaptive model predictive control and online optimization of a natural gas liquefaction process", Chemical Engineering Science, Oxford, GB, vol. 162, Dec. 27, 2016, pp. 21-32.

Brian M. Gonzalez Contreras et al: "An Identification Technique for Linear Systems: Application on a Hydraulic Testbed", Electronics, Robotics and Automotive Mechanics Conference (CERMA), 2012 IEEE Ninth, IEEE, Nov. 19, 2012, pp. 237-242.

Hasan E. et al: "Online System Modeling of Chemical Process Plant using U-Model", 2017 IEEE 3rd International Symposium in Robotics and Manufacturing Automation (ROMA), Sep. 19, 2017, pp. 1-6.

Cetin Merc et al: "Adaptive uncertainty compensation-based nonlinear model predictive control with real-time applications", Neural Computing and Applications, Springer London, London, vol. 31, No. 2, Jun. 21, 2017, pp. 1029-1043.

Venkatasubramanian Venkat et al:, "A review of process fault detection and diagnosis Part III: Process history based methods", Elsevier, Computers & Chemical Engineering, vol. 27, 2003, pp. 327-346.

PCT International Search Report and Written Opinion of International Searching Authority dated Aug. 2, 2019 corresponding to PCT International Application No. PCT/US2019/032125 filed May 14, 2019.

Yang, Fan et al: "Capturing Connectivity and Causality in Complex Industrial Processes"; Apr. 1, 2014 (Apr. 1, 2014), pp. 1-100, XP055894932.

Venkatasubramanian, Rengaswamy, Yin, Kavuri: "A review of process fault detection and diagnosis Part 1: Quantitive models-based methods", Computers & Chemical Engineering, 27, 293-311, 2003.

* cited by examiner

FIG. 2
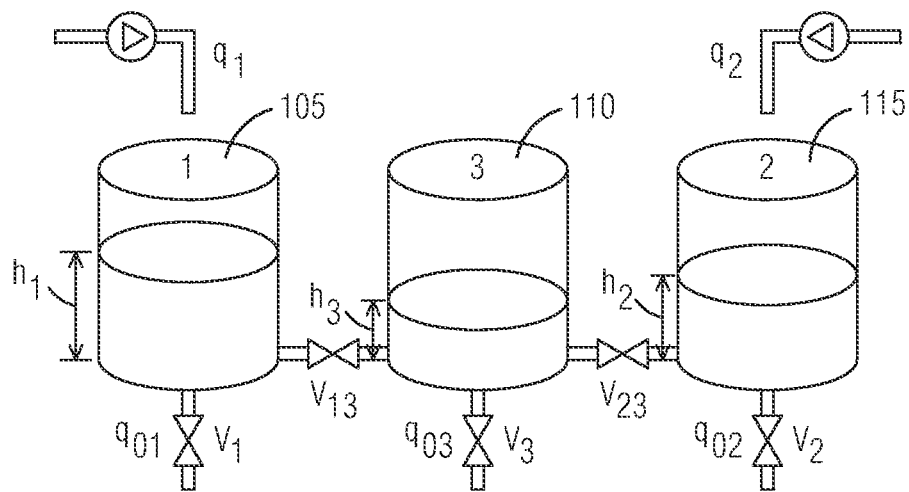
FIG. 3
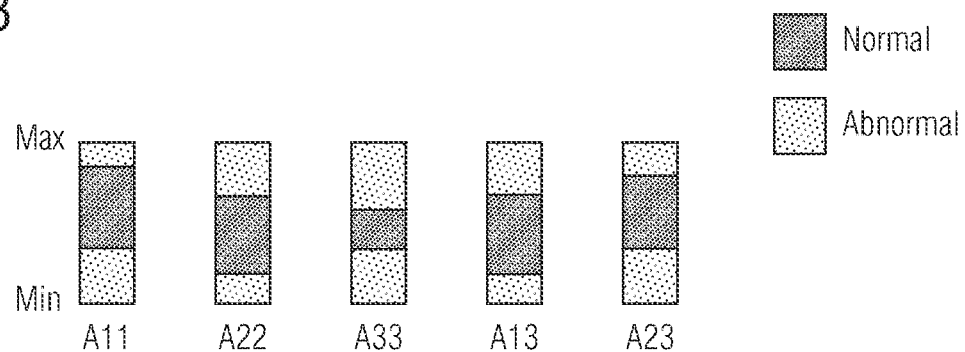
FIG. 4
Generate Look-Up Table from the P&ID Data
| | Case 1 | Case 2 | Case 3 | Case 4 | Case 5 |
|---|---|---|---|---|---|
| A11 | | | | | |
| A22 | | | | | |
| A33 | | | | | |
| A13 | | | | | |
| A23 | | | | | |
| Fault Location | V1 | V2 | V3 | V13 | V23 |

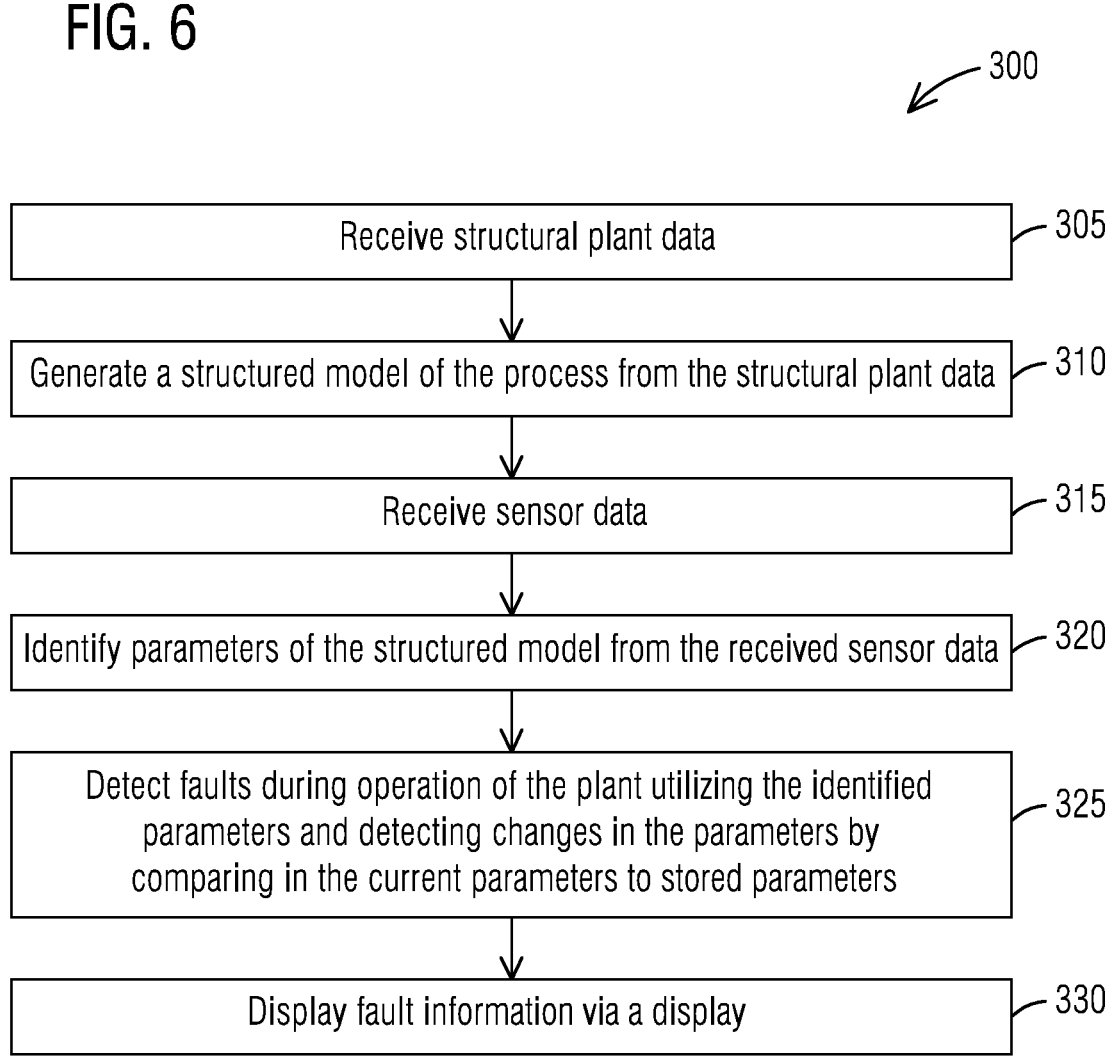

ONLINE FAULT LOCALIZATION IN INDUSTRIAL PROCESSES WITHOUT UTILIZING A DYNAMIC SYSTEM MODEL

BACKGROUND

1. Field

Disclosed embodiments relate generally to the field of fault diagnostics for industrial processes, and more particularly to a method and system for localizing faults in an industrial plant.

2. Description of the Related Art

In industrial processes, fault localization is one of the most important components of the abnormal event management system. It consists of fault detection, which involves the timely detection of the abnormal event, and fault isolation, which involves identifying and localizing the origins of the cause. After the diagnosis, the fault localization component supports the human operator to take appropriate supervisory control decisions and actions to maintain normal and stable operation of the system.

A wide variety of techniques have been developed to deal with fault detection and isolation. On the one hand, there are model-based methods that require a full/partial qualitative/quantitative model of the system. These methods may include fault trees and digraphs, analytical approaches, knowledge-based approaches, and neural networks, for example. The disadvantage of the model-based approach is the requirement of a dynamic model of the industrial plant. On the other hand, there are data-driven methods that do not rely on a dynamic system model. These methods include expert systems, qualitative trend analysis, and quantitative feature extraction methods, etc. The disadvantage of the data-driven approach usually requires installation of additional sensors if the plant is older and requires a lot of data for training.

Given the complexity of the process plant and the number of variables that need to be observed, it is essential to have an online fault localization system for quick diagnosis. The problem becomes very challenging when a dynamic system model is not available and only limited measurement data from existing sensors can be accessed. A fault diagnosis method is proposed to handle these limitations commonly seen in industrial plants.

SUMMARY

Briefly described, aspects of the present disclosure relate to a method and system for localizing faults in an industrial process.

A first aspect provides a method for localizing faults in an industrial process. The industrial process includes a plurality of components. The method includes receiving structural plant data from an industrial plant. A structured model of the process is generated from the structural plant data. Sensor data measuring characteristics of the plurality of components is also received. Parameters of the structured model are identified from the received sensor data and stored. Faults are detected during operation of the industrial plant utilizing the identified parameters and detecting changes in the parameters by comparing current parameters to stored parameters. The fault information is then displayed via a display to an operator.

A second aspect provides a computerized system for localizing faults in an industrial plant. The system includes a model structure extraction module, a structured system identification module, and a fault detection module. The model structure extraction module is configured to generate fault patterns for specific faults of components of the industrial plant based on structural plant data. The structured system identification module is configured to identify a linearized system model of the industrial plant based on sensor data from the plurality of components and the structural plant data. Lastly, the fault detection module is configured to detect and localize faults in the industrial plant utilizing the linearized system model and the fault patterns.

BRIEF DESCRIPTION OF THE DRAWINGS

FIG. 2 illustrates a simple process control example which may be utilized by the proposed method to localize faults according to some embodiments, FIG. 3 illustrates limits for values of determined A matrix terms, FIG. 4 illustrates a look-up table generated from the structured plant data, FIG. 6 illustrates an example method for localizing faults in an industrial process.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Dynamic system models account for time-dependent changes in the state of the system in order to describe the system behavior. These models are typically described with complex nonlinear differential equations which in many cases, do not exist or are extremely difficult to obtain for industrial processes such as that of an industrial plant.

The proposed method is a combination of a model-based and data-driven approaches. It does not require any form of a dynamic model for the industrial plant. Additionally, the proposed method does not require any additional sensor or real-time simulation of the plant nor does it require complex learning or statistical procedures based on large amounts of historical data. Thus, the inventors propose an innovative approach that distinguishes from both the model-based and data-driven approaches.

Briefly, the method and system described herein use sensor data from components of an industrial plant and structured plant data only to create a linearized model of the plant. Utilizing this linearized model and a look-up table based on structural plant data, the method detects and localizes faults within the plant without the need of a dynamic system model.

Figure 1:
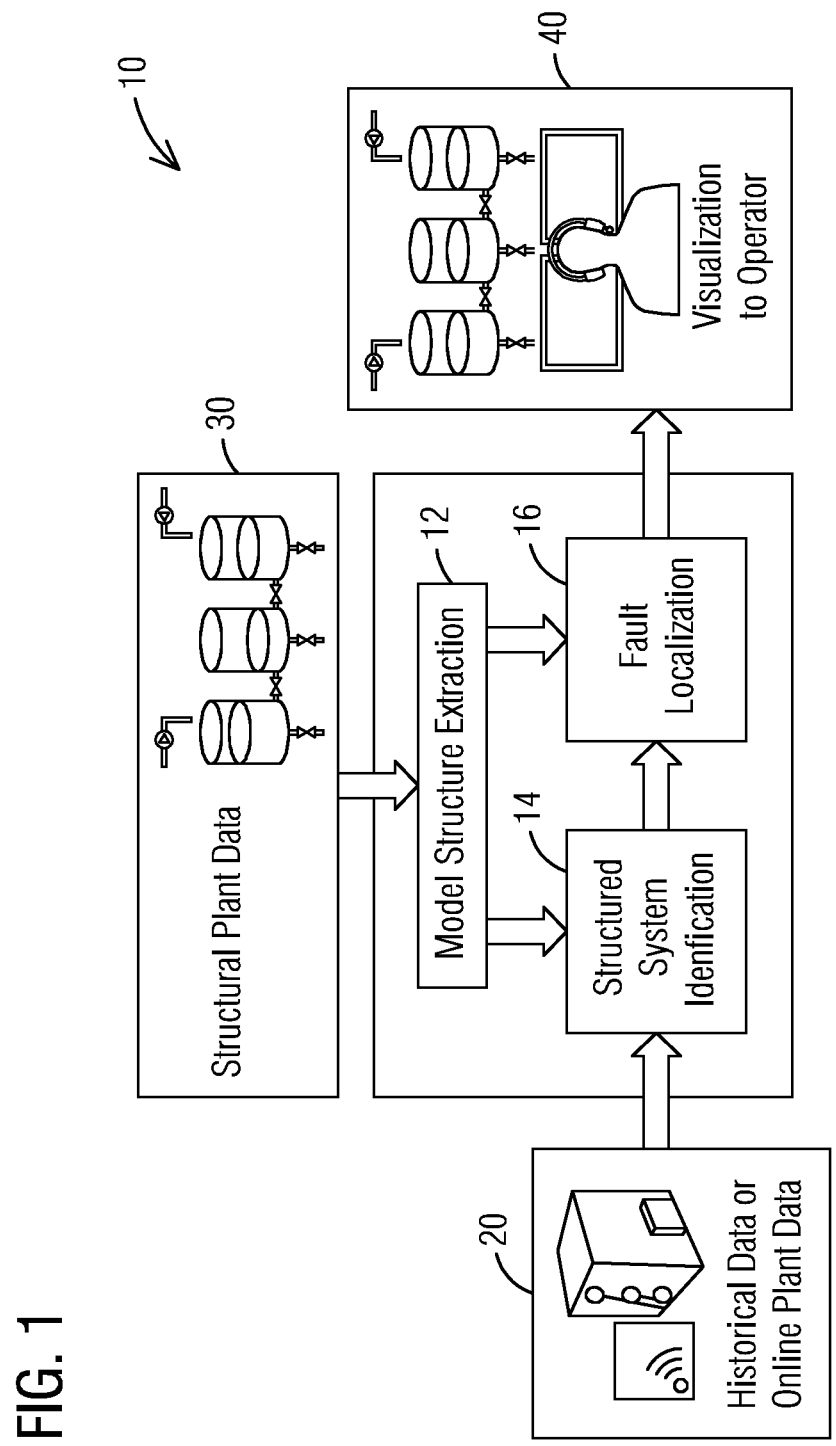
FIG. 1 illustrates a block diagram of an embodiment of the proposed system.

FIG. 1 illustrates a block diagram of an embodiment of a disclosed computerized system 10 for localizing faults in an industrial plant. The system 10 receives as input, data from components within the plant, which in the illustrated case is an industrial plant. The data 20 may be online sensor data received during operation of the plant or historical sensor data that has been previously collected and stored in a database. For example, the sensor data 20 may be measured characteristics of the individual components from sensors disposed within the industrial plant. Additionally, the system 10 may receive structural plant data 30 where the structural plant data 30 describes the physical connections of the components of the plant. In an embodiment, the structural plant data 30 may be represented in a Piping and Instrumentation Diagram (P&ID). The disclosed system 10 may include a Model Structure Extraction Module 12 for receiving the structural plant data 30 and producing a look-up table describing fault patterns of specific faults, a Structured System Identification Module 14 for identifying a linearized system model, and a Fault Localization Module 16 for processing the linearized system model and utilizing the system model and the look-up table to localize any faults that may exist in the plant. Once faults have been detected and localized, the fault data may be displayed 40 to an operator on a display. In certain embodiments, the operator may use the fault information to take the necessary steps to remedy the fault and return the plant to normal operation.

The system 10 may include a Model Structure Extraction module 12. This module 12 receives as input the structural plant data 30. In an embodiment, the structural plant data 30 may be represented in a P&ID which shows piping and process equipment with instrumentation and control devices. The Model Structure Extraction Module 12 may then digitize the structural plant data 30. According to P&ID information, a sparsity topology (sparse matrix) of a linearized system matrix may be identified. For example, for a three-tank system shown in FIG. 2, the corresponding linearized system matrix has a sparsity topology as shown below:

$$A = \begin{bmatrix} A11 & 0 & A13 \\ 0 & A22 & A23 \\ A13 & A23 & A33 \end{bmatrix}$$

A non-zero element in the A matrix represents a physical connection between two components, such as two tanks in the illustrated example of FIG. 2. For example, the element in row 1 column 2 is zero because Tank 1 and Tank 2 are not connected and the element in row 3 column 2 is non-zero because Tank 2 and Tank 3 are connected. The A matrix is symmetric such that elements A12 and A21 have the same value, for example.

After the data is digitized, a look-up table may be generated by the Model Structure Extraction Module 12 where the look-up table describes fault patterns of specific faults based on the structural plant data. For example, the look-up table may include possible fault locations and the corresponding elements from the linearized system matrix that are outside the normal range of operation at a specific time during operation of the plant.

A Structured System Identification Module 14 identifies the linearized system model based on the sensor measurements 20 and the digitized structural plant data 30. In order to identify a linearized system model, the Structured System Identification Module 14 processes the received data and from this data determines how each component affects the other components. For example, a P&ID may be input and utilizing image processing methods the component connection data may be analyzed. Alternately, a technician may manually analyse the connection data from the structured plant data. With this information, the linearized system model may be identified according to the general equation:

$$\dot{x}(t) = Ax(t) + Bu(t) \qquad (1)$$

wherein A may be an n×m matrix as described above and B may be set to 0.

Utilizing the connection data received from the structured plant data 30, the structure of the A matrix may be determined.

Once the linearized system model is identified, the module 14 can use the online operational sensor data 20 to continuously update the values of the A matrix. As long as the system 10 and the plant are operational, the system updates the values of the A matrix continuously. In an alternate embodiment, the historical data which has been previously recorded and stored in a database may be used to update the values of the A matrix.

A Fault Localization Module 16 processes the A matrix of the identified linearized system model. Looking at the recorded values for each entry of the A matrix during fault free operation, limit (max and min) values for each respective entry may be determined. Values outside the limit values for each A matrix entry may be considered abnormal values. Since the plant dynamics may be nonlinear and the plant is operated at different operation points, these limits can allow for large intervals even during normal operation. A mapping may then be generated between the entries in the A matrix and the fault scenarios in the look up table. With the limits determined, the system 10 may detect faults during operation by comparing measurement values with the limit values. After a fault occurs, some but not all, of the A matrix entries of the identified A matrix may be outside of their normal operational limits. The pattern of entries outside their limits can be an identification of the corresponding fault. The Fault Localization Module 16 may then utilize the look-up table to localize the fault.

To illustrate the concepts herein, FIG. 2 provides a simple example of a three-tank plant process control system which may be utilized by the proposed method to localize faults according to some embodiments. As illustrated, three tanks 105, 110, 115 each holding a liquid are connected by valves. Specifically, Tank 1 (105) and Tank 3 (110) are connected by valve $V_{13}$, and Tank 2 and Tank 3 are connected by valve $V_{23}$. Two spigots, $q_1$ and $q_2$, each including a valve, carry a liquid that pours into Tanks 1 and Tank 2, respectively. Each tank, Tank 1 (105), Tank 2 (115), and Tank 3 (110) includes an exit valve, $V_1$, $V_2$, and $V_3$ that may release the liquid. Valves $V_{13}$ and $V_{23}$ control the flow rate of the liquid From Tanks 1 and 2, respectively into Tank 3. It may be assumed that Valves $V_1$ and $V_2$ are closed, that $V_{13}$ and $V_{23}$ are controlled, and that $V_3$ is open and its flow rate is the output $q_{o3}$ of the plant. Sensors disposed in the tanks 105, 110, 115 measure the height of the liquid in the tanks, $h_1$, $h_2$ and $h_3$ respectively. The objective of the system is to keep level $h_3$ in Tank 3 (110) constant. It should be noted that FIG. 2 provides an overly simplified example for illustration purposes. For example, the plant may include a much more complex structure and many sets of different sensors measuring different characteristics of the plant may be included. For the proposed method, the structural plant data found in FIG. 2 and sensor data for $h_1$, $h_2$, and $h_3$ for this system example is all the method requires. For example, the dynamic behaviour of the plant, i.e. the flow rate of the liquid entering the tanks 105, 110, 115, is not needed. The method aims to localize faults in valves $V_1$, $V_2$, $V_3$, $V_{13}$, $V_{23}$ based on the structural plant data 30 and the online plant data 20 including $h_1$, $h_2$, $h_3$, $q_1$, and $q_2$.

The structural plant data 30 is processed by the Model Structure Extraction Module 12 which takes in the data in a P&ID format, for example, and outputs the information in a digital format. The Module Structure Extraction Module 12 may generate a look-up table from this structural plant data 30. Sensor data $h_1$, $h_2$ and $h_3$ is input into the Structured System Identification Module 14. The Structured System Identification Module 14 receives both the sensor data 20 and the structural plant data 30 as input, and processes the data to determine how each component, Tank 1, Tank 2, and Tank 3, for example, affect each other and may create a mapping between a system component failure and the affected elements in the A matrix, i.e., if a component is faulty, which of the elements in the A matrix will be out of their normal operational range. Next the Structured System Identification Module 14 identifies a linearized system model of our system according to equation (1). For our three-tank example the structure of the A matrix may include:

$$A = \begin{bmatrix} A11 & 0 & A13 \\ 0 & A22 & A23 \\ A13 & A23 & A33 \end{bmatrix}$$

The terms of the A matrix describe connection data between components in the system. For example, the terms $A_{12}$ and $A_{21}$ equal 0 because no connection data exists between Tanks 1 and 2. At this point, the other A terms are variable. The system 10 is then put in an operational online mode in which sensor data is collected and utilized to record A matrix values at specific moments in time. The A matrix values are recorded continuously for a specific time period, e.g. days or weeks. At the end of this time period, the Fault Localization Module 16 determines limits for each A matrix term. Looking now at FIG. 3, the normal range and abnormal range of values of $A_{11}$, $A_{22}$, $A_{33}$, $A_{13}$, and $A_{23}$ are determined based on the identified matrix A during the operational online mode. For example, the normal range for the matrix term Au may be between 0-4; anything outside of this range would be abnormal and may be interpreted as a fault.

Now, referring to the table of FIG. 4, a mapping may be made between the A matrix terms and the fault scenarios described in the shown look-up table. Looking at column 1, Case 1 in the look-up table, it may be seen that $A_{11}$ is marked as having a value outside its normal range. This fault scenario corresponds to the component $V_1$. From this look-up table, it can be concluded that an error has occurred in V1. Likewise, Case 2 describes a fault with V2. Thus, from the look-up table, faults may be localized, i.e., one may determine which component is experiencing a fault. In a further example, Case 4 shows that several A matrix terms $A_{11}$, $A_{33}$, and $A_{13}$ are outside their normal ranges. This fault scenario in the look-up table describes a fault with $V_{13}$. Thus, the look-up table approach combines the fault detection and the fault isolation in one step.

Although FIGS. 2-4 represent a relatively simple case, the general approach of fault localization for an industrial process without using a dynamic model of the plant may be applied to more complex system. For example, an industrial plant process may include a variety of subsystems including a conveyer belt, robots, and components having a variety of subcomponents or subsystems. For example, the production of an automobile includes many systems and subsystems as well as components and subcomponents. Similar to the three-tank example illustrated in FIG. 2, a production line in an industrial manufacturing plant may have multiple subsystems connected to one another. Product components may move between the different subsystems, similarly to the liquid flowing between the different tanks in the three-tank example. With the P&ID information of the production line, connection information between the different subsystems may be obtained. The look up table may then be created as described. With the look up table and sensor data information the proposed method may be utilized for the production line.

FIG. 6 illustrates an example method 300 for localizing faults in an industrial process according to an embodiment. The industrial process may comprise an industrial plant including a plurality of components. The method may be performed, for example, by one of the processors in the industrial control process or by a remote computing device connected to the system over a network (e.g. the Internet). In this example, structural plant data 30 corresponding to the industrial plant is received at step 305. Sensor measurement data may be received, for example, from a component of the plant, in step 315. In general, any type of sensor measurement may be used that provides data on a characteristic of a component of the plant.

At step 310, the computerized system 10 generates a look-up table from the structural plant data 30. The look-up table describes fault patterns of specific faults for the components of the plant. At step 320, the computerized system identifies a linearized system model of the plant based on the structural plant data 30 and the sensor data 20. A mapping may then be made between terms in the linearized system model and the fault scenarios in the look-up table. In some embodiments, a range of values for the terms in the linearized system model are determined. This range of values may be used to detect and localize faults during operation of the plant utilizing the look-up table in step 325. The fault information may be displayed 40 in real-time via a display to an operator of the system at step 330.

As is well understood, the software aspects of the present invention could be stored on virtually any computer readable medium including a local disk drive system, a remote server, internet, or cloud-based storage location. In addition, aspects could be stored on portable devices or memory devices as may be required. The computer generally includes an input/output device that allows for access to the software regardless of where it is stored, one or more processors, memory devices, user input devices, and output devices such as monitors, printers, and the like.

Figure 5:
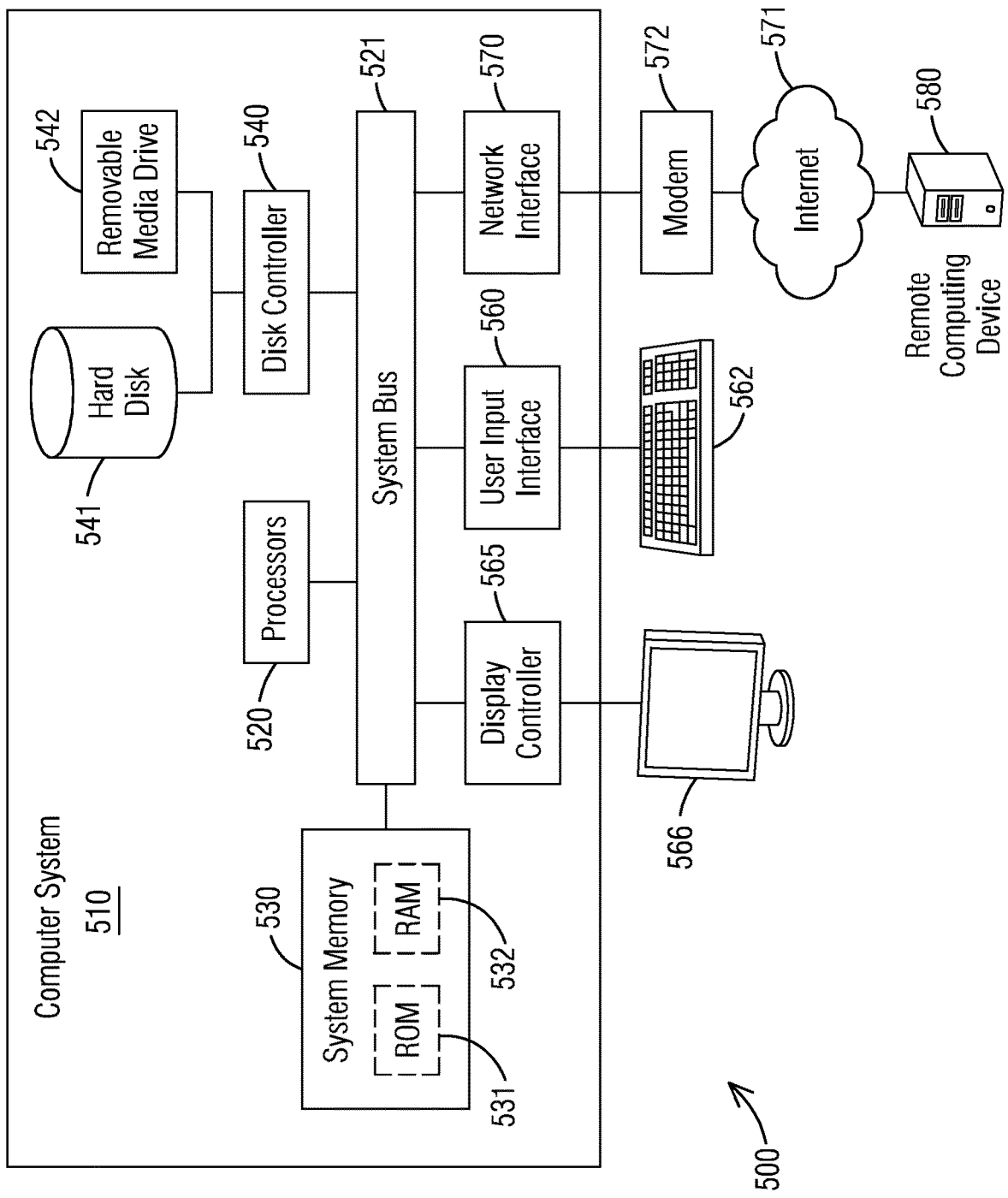
FIG. 5 is a block diagram of a computer system that may be used to implement aspects of embodiments of the present disclosure.

FIG. 5 illustrates an exemplary computing environment 500 within which embodiments of the invention may be implemented. Computers and computing environments, such as a computer system 510 and computing environment 500, are known to those of skill in the art and thus are described briefly here.

As shown in FIG. 5, the computer system 510 may include a communication mechanism such as a system bus 521 or other communication mechanism for communicating information within the computer system 510. The computer system 510 further includes one or more processors 520 coupled with the system bus 521 for processing the information.

The processors 520 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks.

Continuing with reference to FIG. 5, the computer system 510 also includes a system memory 530 coupled to the system bus 521 for storing information and instructions to be executed by processors 520. The system memory 530 may include computer readable storage media in the form of volatile and/or nonvolatile memory, such as read only memory (ROM) 531 and/or random-access memory (RAM) 532.

The computer system 510 also includes a disk controller 540 coupled to the system bus 521 to control one or more storage devices for storing information and instructions, such as a magnetic hard disk 541 and a removable media drive 542 (e.g., floppy disk drive, compact disc drive, tape drive, and/or solid-state drive). Storage devices may be added to the computer system 510 using an appropriate device interface (e.g., a small computer system interface (SCSI), integrated device electronics (IDE), Universal Serial Bus (USB), or FireWire).

The computer system 510 may also include a display controller 565 coupled to the system bus 521 to control a display or monitor 566, for displaying information to a computer user. The computer system includes an input interface 560 and one or more input devices, such as a keyboard 562, for interacting with a computer user and providing information to the processors 520.

The computer also includes communication devices that may allow for communication between other computers or computer networks, as well as for communication with other devices such as machine tools, work stations, actuators, controllers, sensors, and the like. When used in a networking environment, the computer system may include a network interface such as a modem for establishing communications over a network 571. The network 571 such as those generally known in the art, e.g., the Internet, may provide communication between the computer system 510 and other remote computer devices 580.

The processor 520 could include a standard micro-processor or could include artificial intelligence accelerators or processors that are specifically designed to perform artificial intelligence applications such as artificial neural networks, machine vision, and machine learning or deep learning. Typical applications include algorithms for robotics, internet of things, and other data-intensive or sensor-driven tasks. Often AI accelerators are multi-core designs and generally focus on low-precision arithmetic, novel dataflow architectures, or in-memory computing capability. In still other applications, the processor may include a graphics processing unit (GPU) designed for the manipulation of images and the calculation of local image properties. The mathematical basis of neural networks and image manipulation are similar, leading GPUs to become increasingly used for machine learning tasks. Of course, other processors or arrangements could be employed if desired. Other options include but are not limited to field-programmable gate arrays (FPGA), application-specific integrated circuits (ASIC), and the like.

The proposed system and method for fault identification and localization easily identifies and locates faults without the need for a dynamic plant model. The method works with any industrial process where access to structural plant data and online plant data through sensor measurements is available. In particular, the system works for brown-field industrial processes in which a dynamic model usually does not exist or is difficult to obtain. Brown-field industrial processes typically include processes that are already existing. The proposed method can be used on these brown-field processes without having to install any new sensors or make any changes to the industrial plant. Additionally, high computational power or utilizing advanced learning methods are not necessary as the proposed method requires only a linear system identification based on existing sensor data and structural plant data.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A method for localizing faults in an industrial process, the industrial process comprising an industrial plant including a plurality of components, the method comprising:
   receiving structural plant data describing physical connections of the plurality of components of the industrial plant, wherein the physical connections include piping connections;
   digitizing the structural plant data to identify a linearized system matrix, wherein a non-zero term in the linearized system matrix represents a physical connection between two components;
   generating, in the form of a look-up table, fault patterns for specific faults of the components of the industrial plant using the structural plant data, wherein the look-up table includes a mapping between specific faults of the components and terms of the linearized system matrix that are outside a term-specific range of normal operational values;
   receiving sensor data from sensors measuring characteristics of the plurality of components;
   identifying a linearized system model of the industrial plant based on the sensor data and the digitized structural plant data;
   continuously updating values of terms of the linearized system matrix based on the sensor data for a specified amount of time during fault free operation of the industrial plant;
   determining the term-specific range of normal operational values for each term of the linearized system matrix based on the updating;
   detecting and localizing faults during operation of the industrial plant based on the range of normal operational values for each term of the linearized system matrix and the look-up table; and
   displaying fault information via a display to an operator.

2. The method as claimed in claim 1, wherein the linearized system model is described according to the equation, $$\dot{x}(t)=Ax(t),$$

wherein A is the linearized system matrix, the terms in the linearized system matrix A corresponding to connection information between the plurality of components.

3. The method as claimed in claim 1, wherein the detecting step further comprises:
   comparing a value of each term with its corresponding range of normal values, and wherein when the value lies outside the range of normal values a fault is declared.

4. The method as claimed in claim 1, wherein the linearized system matrix is generated from the structural plant data using image processing algorithms.

5. The method as claimed in claim 1, wherein the sensor data comprises online sensor measurements.

6. The method as claimed in claim 1, wherein the sensor data comprises historical data.

7. The method as claimed in claim 1, wherein the structural plant data includes a Piping and Instrumentation (P&ID) diagram of the industrial plant.

8. The method as claimed in claim 1, wherein the industrial process is a brownfield industrial control process.

9. The method as claimed in claim 1, wherein the fault information is displayed to the operator in real time.

10. A computerized system for localizing faults in an industrial plant, the industrial plant including a plurality of components, the computerized system comprising:
- a model structure extraction module configured to receive structural plant data describing physical connections of the plurality of components of the industrial plant, wherein the physical connections include piping connections, digitize the structural plant data to identify a linearized system matrix, wherein a non-zero term in the linearized system matrix represents a physical connection between two components, and generate, in the form of a look-up table, fault patterns for specific faults of the components of the industrial plant based on structural plant data of the industrial plant, wherein the look-up table includes a mapping between specific faults of the components and terms of the linearized system matrix that are outside a term-specific range of normal operational values;
- a structured system identification module configured to identify a linearized system model of the industrial plant based on sensor data received from sensors measuring characteristics of the plurality of components and the digitized structural plant data, continuously update values of terms of the linearized system matrix based on the sensor data for a specified amount of time during fault free operation of the industrial plant; and
- a fault detection module configured to determine the term-specific range of normal operational values for each term of the linearized system matrix based on the updating, and detect and localize faults during operation of the industrial plant based on the range of operational values for each term of the linearized system matrix and the look-up table.

11. The system as claimed in claim 10, wherein the structural plant data 30 includes a Piping and Instrumentation (P&ID) diagram of the industrial plant.

12. The system as claimed in claim 10, wherein the sensor data is online sensor data.

13. The system as claimed in claim 10, wherein the sensor data is historical sensor data.

14. The system as claimed in claim 10, wherein the industrial plant is a brownfield industrial control process.

* * * * *